Feb. 21, 1950 D. B. TALBOT 2,498,613

ALARM SYSTEM

Filed Sept. 20, 1948 4 Sheets-Sheet 1

Inventor

David B. Talbot

By Clarence A. O'Brien and Harvey B. Jacobson

Attorneys

Feb. 21, 1950 D. B. TALBOT 2,498,613

ALARM SYSTEM

Filed Sept. 20, 1948 4 Sheets-Sheet 2

Inventor

David B. Talbot

By Clarence A. O'Brien and Harvey B. Jacobson

Attorneys

Feb. 21, 1950 D. B. TALBOT 2,498,613

ALARM SYSTEM

Filed Sept. 20, 1948 4 Sheets-Sheet 3

Inventor

David B. Talbot

By Clarence A. O'Brien and Harvey B. Jacobson

Attorneys

ALARM SYSTEM

Inventor
David B. Talbot
By Clarence A. O'Brien
and Harvey B. Jacobson
Attorneys Patented Feb. 21, 1950 2,498,613

UNITED STATES PATENT OFFICE 2,498,613

ALARM SYSTEM

David B. Talbot, Britton, Okla., assignor of one-tenth to H. S. Brimm, one-tenth to H. W. Sims, and one-fifth to Frank W. Jones, all of Oklahoma City, Okla.

Application September 20, 1948, Serial No. 50,055

12 Claims. (Cl. 179—5)

This invention relates to alarm systems using the telephone lines of a subscriber for transmitting an alarm to a predetermined alarm station and it has for its main object to provide a completely automatic alarm system capable of calling any station within the telephone network which has been designated in order to receive the required alarm message preferably in the form of a spoken message repeated from a record.

Systems are known in which alarm circuits are operating transmitters broadcasting a message or in which such a message is delivered over special lines or over telephone lines which have however to be tapped in order to connect with them special alarm apparatus. The first named systems may only be used in connection with a special organization of listeners to the broadcast and are moreover hardly reliable. The second method is not accepted by the operators of a telephone system, because it puts loads and connections on the lines which may cause serious disturbances and accidents.

It is therefore the primary object of the invention to provide means whereby any predetermined subscriber station of the telephone network such as a fire department or a police station may be automatically called upon the closure of an alarm circuit and in which, when the connection with the said subscriber station has been completed, a recorded message is delivered over the telephone lines which may be picked up in the receiver of the called station in the usual manner.

It is a further object of the invention to provide an alarm system with dialling means, which are operated to call the desired station at regular intervals delivering the message between said intervals incessantly until the operation is stopped.

It is a further object of the invention to provide an alarm system with recording and dialling means which start their operation, when an alarm impulse has been given, and which continue their operation regardless of whether the alarm impulse persists or disappears.

It is a further object of the invention to provide an alarm system with recording and dialling means which start their operation upon the production of an alarm impulse but the operation of which may be stopped by the operator at the remote station when the alarm message has been received.

It is a further object of the invention to provide means of such type that short impulses are sufficient to control all operations which, once initiated, continue regardless of the duration of the electric control impulses.

Further more specific objects will be apparent in the course of following the following detailed specification.

The invention is illustrated in the accompanying drawings and is described by way of example only. It will be readily understood that the example shown and described intends to explain the principle on which the invention is based and one of the best modes to apply this principle. This explanation will provide sufficient information to the expert skilled in the art to apply the same principle or principles in a modified way to other cases, and modifications of the example shown are therefore not necessarily departures from the essence of the invention.

Figures 7, 8, 9:
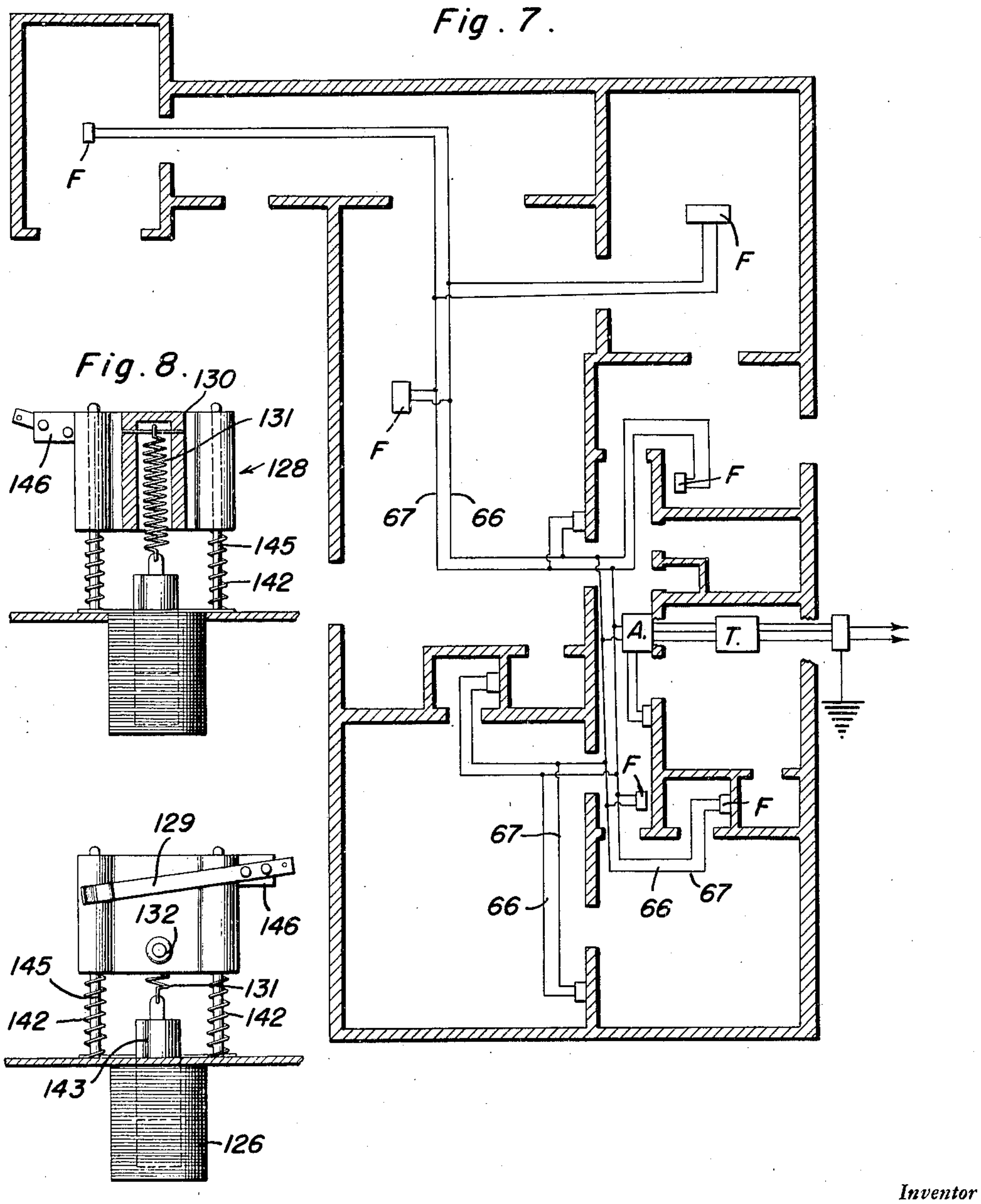
Figure 7 is a diagrammatic view of the general arrangement of the units used.
Figures 8 and 9 are front and rear elevational views of the solenoid and slide of the dialling unit.

The principle on which the alarm system according to the invention is based may best be explained in connection with Figure 7 of the drawing.

If it is assumed that a home, hotel, boarding house and the like is to be protected, the system consists essentially of the thermostatic or other feelers F of which a number is provided in the rooms, closets, garages, etc., to be protected, of the telephone T and of the automatic transmitter A. Some of the feelers F may of course be contacts operated by illicit entry into the house or rooms and therefore may form part of a combined fire and burglar alarm system. These feelers put into operation the automatic transmitter A which dials the call number of any fire department or police station which may have been set and thereafter delivers automatically a message stating the nature of the emergency and the location of the premises. When the message has been delivered and has been taken down, the attendant in the exchange of the fire department or police station closes a relay circuit which terminates the further operation of the transmitter.

The telephone T is the ordinary business telephone and its peculiarity consists merely in the use of a special or second dialling loop circuit, which is interrupted as long as the transmitter does not work, but which, upon operation is switched in and, as soon as switched in, operates very much as the usual loop circuit over which dialling takes place and the conversation is conducted.

As will be seen from the above the most important unit of the system is the automatic transmitter A which performs all the above named functions.

Figure 1:
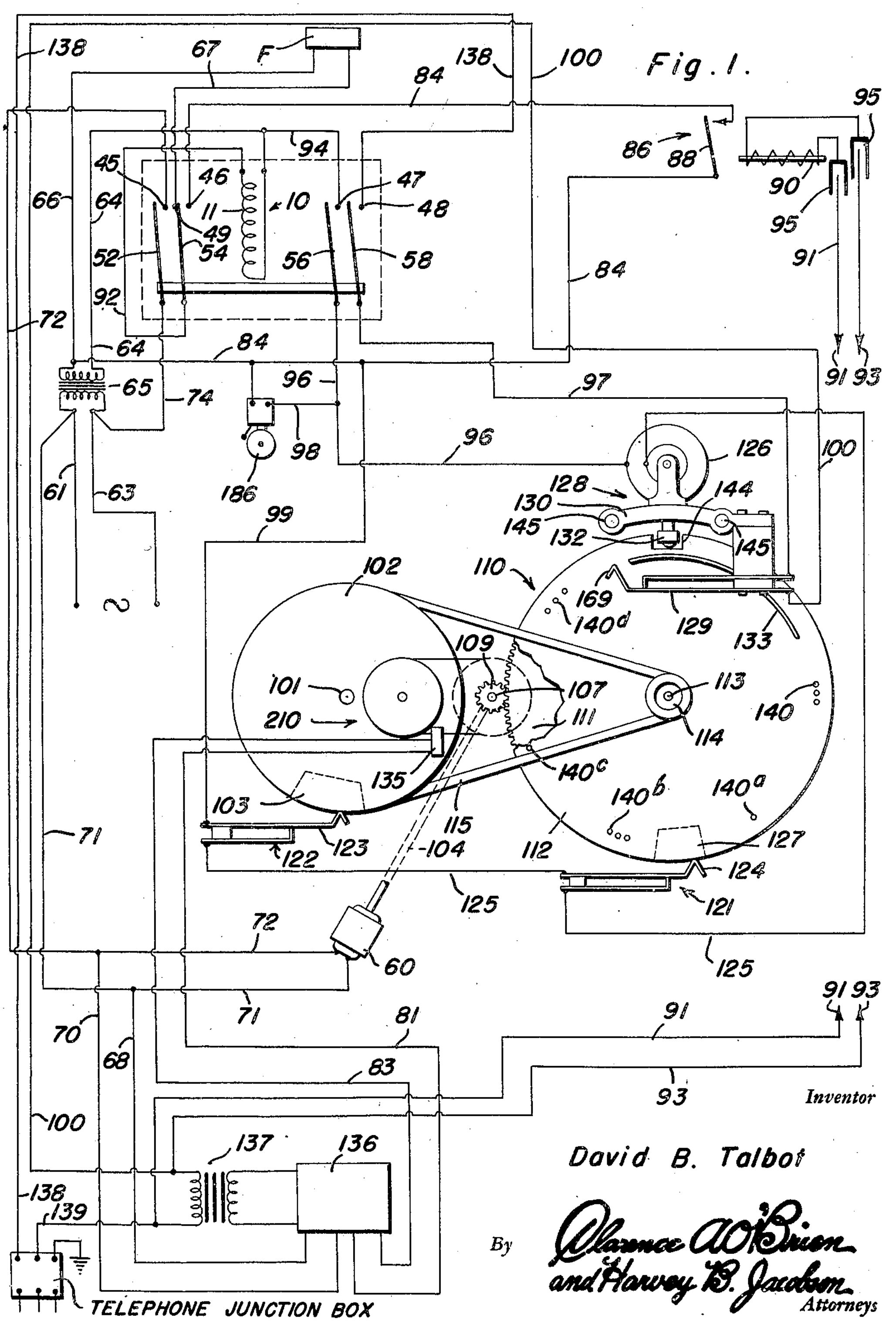
Figure 1 is a diagram of the connections used in the system.
Figure 2:
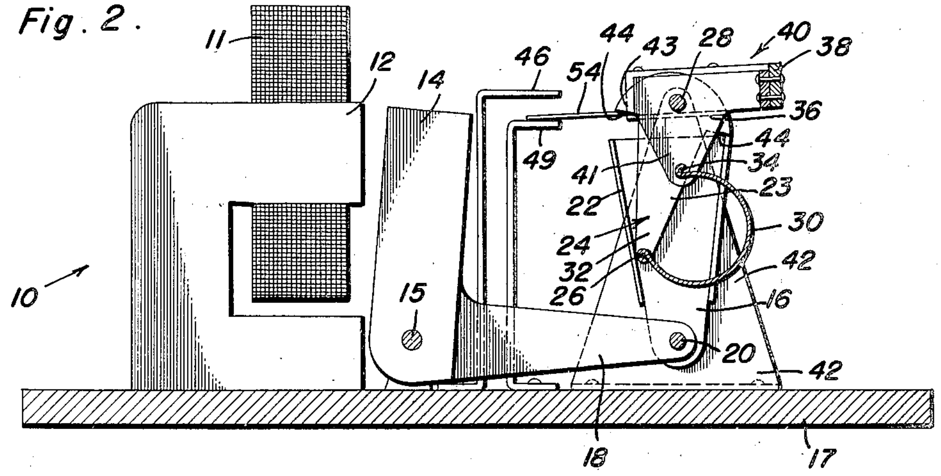
Figure 2 is a partly sectional elevational view of the relay unit the section being taken along line 2—2 of Figure 3.

This automatic transmitter consists essentially of a relay arrangement generally indicated at 10 in Figures 1 and 2 which is operated by the feelers in an emergency and which closes all the circuits which are necessary for the transmission of the message. It further consists of a dialling system generally indicated at 110 in Figure 1 and of a recording and message delivering system generally indicated at 210 which also includes an amplifier. It finally includes a remotely controlled relay switch generally indicated at 86 in Figure 1 which stops the further operation.

All the units are operated either directly from the means carrying the usual 110 or 220 volt A. C. or from a step down transformer 65 connected with the same.

The electromagnetic relay arrangement generally indicated at 10 comprises a laminated core 12 mounted on a base plate 17 and carrying the energizing coil 11 the connection of which is described below. The core acts on a laminated armature member 14 which is pivotally supported on a pin 15 around which it may rock. The contacts of the relay are also mounted in a row on the base plate 17. Four fixed contacts 45, 46, 47, 48 are shown which all come into contact with corresponding contact springs 52, 54, 56, 58 operated by the relay armature in a manner to be described. One contact 49 is so positioned that it comes into contact with its spring (54) when the latter is in its original position. This contact is connected with the feeler circuits 66, 67.

The movable contact springs 52, 54, 56, 58 are operated by means of arms 18 projecting from the armature member 14 and carrying a pin 20, on which two push members 16 having inwardly turned edge portions or flanges 22 are mounted. These members are pushed or moved upwardly when the relay coil 11 is energized.

Figure 3:
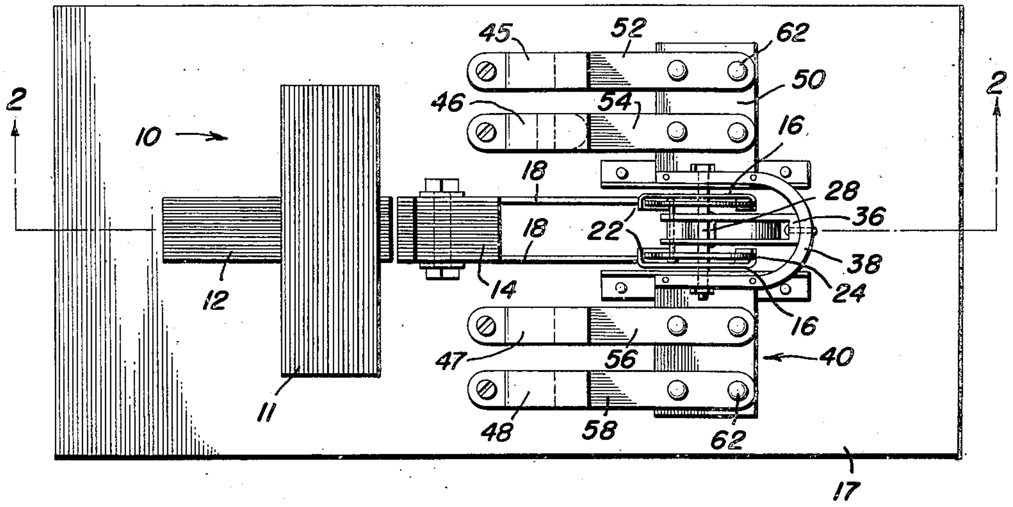
Figure 3 is a plan view of the relay unit.

The base plate 17 moreover carries two approximately triangular or tapering supporting plates 42 which, by means of a pintle or pivot pin 28 at or near their top, pivotally support a rocking unit generally designated by 40 to which the movable contact springs 52, 54, 56, 58 are attached. This unit comprises a horseshoe shaped yoke member 38 on the outside of which wing plates 50 are fastened on which the movable contact springs are mounted. To the central portion of the yoke a U-shaped holder 36 is riveted which has depending portions 41 carrying a pin 34. On both sides of this holder but within the space encircled by the yoke member 38, and arranged between the inwardly turned flanges 22 of the push members 16 are swing members 24 with a tapering or triangular leg portion 23 supporting a head 43 of large dimensions so that shoulders 44 are formed between said body and said head which are so positioned that they may come alternatively into contact with the top of the flanges 22 of member 16. The head 43 is rockably mounted on pivot pintle 28, around which the members 24 may swing. The swing members on both sides are joined by a pin 26. Between said pin 26 and the pin 34 carried by the depending portions of member 36 a horseshoe shaped or semicircular spring 30 is arranged coupling the members 36 and 24 by its tension. However it will be seen that the members 24 may assume two positions into which they are urged and in which they are held by the spring 30, one of which is determined by the leg 23 finding its rest on the flange 22 of push member 16 on the right side (Figures 2 and 3) while the other is determined by the same leg resting on the flange on the left side. Which position will be assumed next will be determined by the position in which it rests for the time being. For when the leg 23 of member 24 rests on the left flange 22 in in Figures 2 and 3 the shoulder 44 on the right side of the head 43 rests on push member 16 and when the leg member 23 rests on the right flange 22 the shoulder 44 on the left side of head 43 rests on said member 16. A lifting of the push member will therefore cause the member 24 to swing to the left or to the right according to the position it occupies at the time.

It will also be clear that the tension spring 30 in the position shown in Figure 2 will urge the end of leg 23 against flange 22 and simultaneously presses on pin 34 urging it toward the right in Figure 2. Therefore the yoke member 38 and the wing plates 50 together with the contact springs attached to it are urged to turn counter-clockwise around pivot 28 and are therefore held in the position shown in Figure 2 in which contact spring 54 rests on the lower fixed spring 49. When however the relay is energized for the first time arm 18 and push member 16 are lifted, and the swing member 24 is moved to the other side, tilting the horseshoe member 38 and bringing the movable contact springs into contact with the upper fixed springs 45, 46, 47, 48. The next energization will restore the position first described and so forth. It will be understood that it is immaterial whether or not the relay remains energized for some time and a short energization determines mechanically which contacts remain operative.

The relay as seen from Figure 1 is energized from the main conductors 61, 63 of the building (which are usually 110 v. or 220 v. A. C. mains) by means of a transformer 65 furnishing a current of smaller voltage. It is also seen that when the relay is at rest the fixed contact 49 on which the movable contact spring 54 rests is connected with the feeler circuit 67, 66 while the contact spring 54 is connected with the relay winding 11 which in its turn is fixedly connected with one of the transformer leads 64.

The relay unit 10 as already explained controls the operation of the dialling unit 110 and the message delivering unit 210 connecting with the telephone.

Figures 4, 5:
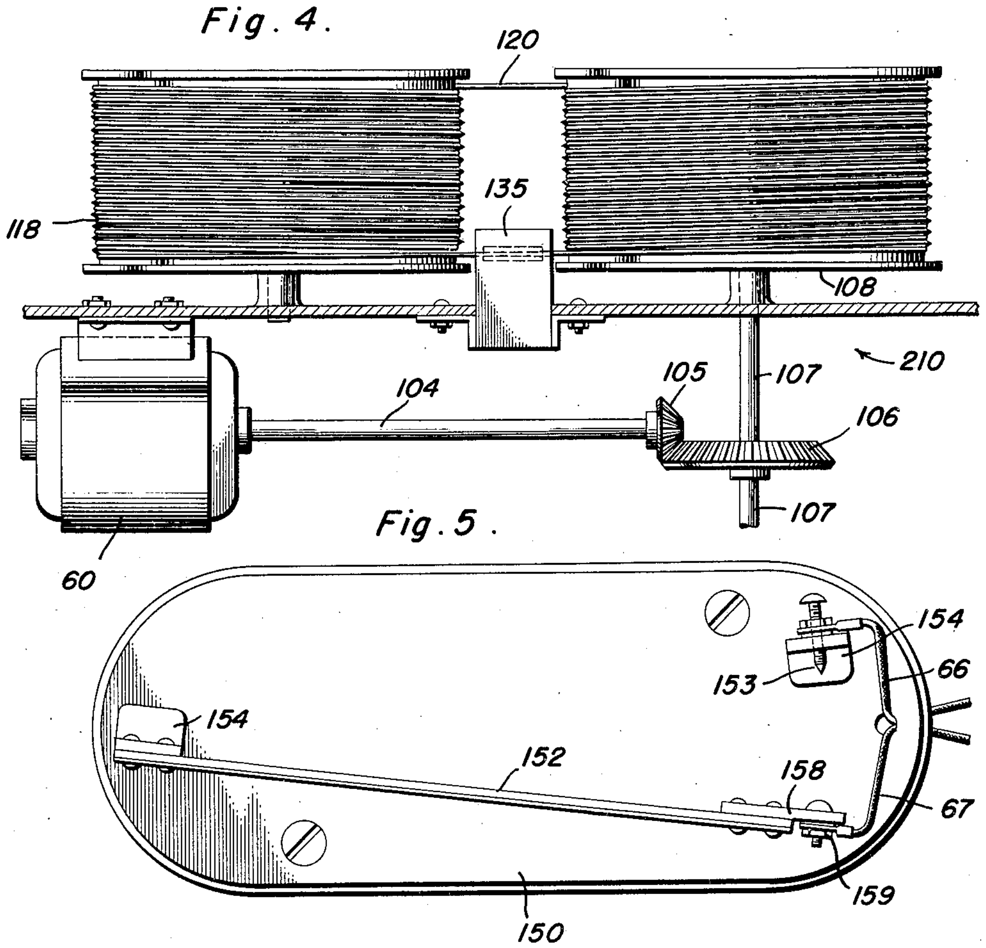
Figure 4 is an elevational view partly in section of the recording unit.
Figures 5 and 6 are a plan and an elevational view respectively of the thermostatic alarm contact unit with the cover removed.

The message delivering unit 210 shown in Figure 4 comprises a motor 60 of any approved type driving a shaft 104 which by means of a bevel gear 105, 106 drives a main driving shaft 107 from which the motion of the recording unit and of the dialling unit are both derived.

The recording unit consists of two drums 108, 118 each provided with a spiral groove arranged in the manner of a screw thread with the turns closely adjacent to each other. The pitch of the spirals in the two drums is in opposite direction. An endless steel wire 120 is held in said grooves and is wound on each drum in many turns; it then passes on to the second drum where it is wound in a like manner. Rotation of one of the drums will also rotate the second drum as the wire acts as a motion transmission member. It will however be clear that the wire 120 during such rotation is moved constantly as it is unreeled on one end and reeled up on the other end of the drum.

The wire 120 carries a magnetic record made in the usual way. The record contains merely a message stating the nature of the emergency, the exact location of the premises and if necessary additional information such as the location of the key, the storing of inflammable material requiring specific extinguishers or the like which is repeated again and again.

In the space between the two drums a magnetic head 135 of the usual type is arranged in which the cross magnetization of the wire is translated into electric currents as usual, which are then amplified in an amplifier 136. The amplifier is energized by a branch line 68, 70 connected with the energizing circuit 71, 72 which is controlled by one of the contact springs 45 of the relay unit 10.

Its output is delivered over a transformer 137 into the telephone line 100, 129, 97, 58, 48, 138, 139 of the subscriber station.

The dialling unit 110 comprises a disk 112 provided with a cut 144 and carrying an arcuate cam rail 133 and a number of groups of pins 140, 140*a*, 140*b*, 140*c* . . . the purpose of which will be explained below. Moreover the disk carries an insulating cam block 127 which cooperates with a pair of springs 121, one of which is provided with a head 124 adapted to be pressed against the other spring when the cam block rotates past it. Thereby a circuit 125 is closed during the passage of the cam block.

The disk 112 is driven by a shaft 113 on which a toothed wheel 111 is keyed which is driven by a small pinion 109 which is carried by the main driving shaft 104. As the latter is driven by motor 60 it will be clear that when the motor is energized disk 112 will be driven at a speed which will be determined by the ratio of pinion 109 and toothed wheel 111.

Shaft 113 also drives a disk or pulley 102 by any appropriate means. For instance the shaft may carry a pulley 114 which by means of some belt, or by other means drives a second pulley 102, rotating around an axis 101 and carrying a cam block 103 cooperating with a pair of contact springs 122. One of these springs 123 is provided with a head cooperating with the cam block 103 and is pressed towards the other spring when the cam block presses on the head of spring 123. The pair of springs 122 is included in the circuit 125 which also contains springs 121.

It will be clear that the rotational speed of pulley 102 will be dominated by the ratio of the diameters of pinion 109, wheel 111, pulley 114 and pulley 102.

Near disk 112 a solenoid unit 128 is placed which consists of a solenoid coil 126 (Figures 1, 8 and 9) with a core 143 which is attached to a slide piece 130 by means of a spring 131. The slide piece is guided by the guide rods 145 and is moved against the action of springs 142 wound around the guide rods which are interposed between the slide and a fixed base. This slide moreover carries a small roller 132, adapted to pass through cut 144 or disk 112 when the latter is in the proper position with respect to the slide and it moreover carries a projecting bracket 146 on which a pair of springs 129 is mounted.

One of these springs of the pair is provided with a head 169 cooperating with the arcuate rail 133 which separates the springs as long as it is in contact with the head 169.

It will also be clear that the rail 133 can only act on the pair of springs when the solenoid 126 is energized and the bracket therefore brings the pair of springs into operative position with respect to cam rail 133.

Moreover it will be understood that when the solenoid 126 is energized the small roller 132 will run on top of the disk 112 the spring 131 permitting the movement of the core 143 even when the slide cannot follow. The spring is however tensioned and as soon as the cut of the disk reaches the place below roller 132, the latter passes through the cut. Even if the solenoid is now deenergized the roller 132 will be held below the disk and the slide will occupy a position corresponding to the energization of the solenoid. In this position the cam rail 133 separates the springs 129 and opens circuit 97, 99.

The relay 10 may also be operated over a circuit 84 which contains the switch 86, operable from the remote end of the telephone line in the exchange of the fire department. This switch comprises preferably an electromagnet 90, energized by conductors 91, 93 containing preferably (but not necessarily) condensers 95. The lines 91, 93 are connected with the telephone lines 100, 139. In the exchange (not shown) a switch may be provided, preferably associated with an impulse generator, producing a number of impulses to which the condensers are tuned, by means of which the electromagnet 90 may be energized. This electromagnet attracts armature 85 and closes the circuit through relay winding. The energization of the relay then brings the yoke member 38 back into its original position.

Figure 6:
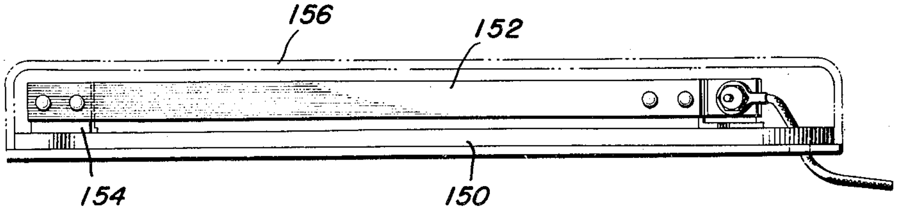

The temperature feeler F is finally shown in Figures 5 and 6. It consists of a base 150 on which an angular bracket 154 is mounted carrying a bimetallic strip 152. The tip of the bimetallic strip may carry a plate 158 with a terminal post to which one of the wires 67 is attached. The other wire 66 of the feeler circuit leads to a terminal screw 153 the point of which projects from a bracket 154 mounted on the base 150. When the bimetallic strip 152 is heated it flexes and bends itself until at a certain temperature the plate 158 is pressed against screw 153 and the circuit 66, 67 is closed.

The operation of the system is the following.

Assuming that one of the thermostatic or entrance guarding contacts F is closing one of the circuits 66, 67 and further assuming that the relay unit 10 is in the position shown in Figure 2 a circuit will be closed from secondary of transformer 65 over conductors 66, unit F and conductor 67 to contact 49 and over contact spring 54, relay winding 11 to conductor 64 and back to the secondary of transformer 65. The relay will therefore be energized, the armature 14 is attracted the side arms 18 are raised, the push member 16 is lifted and its top pushes head 43 of spring member 34 at shoulder 44 upwardly. Therefore swing member 24 snaps into a position in which pin 26 is at the right of the vertical line passing through pivot 28 in Figure 2. The spring 30 therefore presses pin 34 to the left in Figure 2 and contact springs 52, 54, 56, 58 come into contact with contacts 45, 46, 47, 48.

This position will be maintained even if the impulse through relay winding 11 was only a transitory impulse.

The change of position of the member 50 carrying the contact springs closes a number of circuits. First the circuit through motor 60 is closed at contact spring 52. This circuit runs from main line 61 over 71 to motor 60, and over 72—45—52—74 to 63. The motor 60 therefore starts to run. Current is also supplied over 70 and 68 to the amplifier 136. As from this current the amplifier tube filaments are supplied with current the amplifier starts to warm up. With the start of the motor the shaft 104 starts to rotate, rotating pinion 109, toothed wheel 111, shaft 113, pulleys 114 and 102.

Contact spring 54 which now is moved over to contact 46 brings the winding 11 into the circuit 84 so that it is operable from the exchange.

Contact spring 56 closes the circuit of alarm bell 186 which runs from the secondary 65 over 66—84—186—98—96—47—94—64 secondary 65. Moreover a parallel circuit is ready to be closed, branching off from 84 and running over 99 the springs 122 and 121, and 125 to solenoid 126 and over 96 to 56—47—94 and 64. Springs 122 and 121 are open at the start and cam block 103 is set in such a way that it will come into contact with head of spring 123 only when the amplifier has warmed up.

The gear ratio between 109 and 111 and the motor speed are so selected that disk 112 completes a revolution in say ten seconds. Disk 102 then is driven at a speed which corresponds to one revolution in say forty-five seconds.

Simultaneously the drum 108 starts to rotate and the wire 120 is drawn through the magnet head, producing small induction currents sent to the amplifier over wires 81, 83. The wire 120 is continuously drawn along as will be clear as long as the motor drives the drum 108.

Finally contact spring 58 closes the dialling loop connected with the telephone (and in parallel to the usual loop) this circuit running over 138—48—58—97 springs 129—100.

After the warming time for the amplifier cam block 103 closes springs 122 and cam block 127 closes springs 121. Thereby the preformed circuit through the solenoid 126 (traced above) is closed and the solenoid 126 attracts its core and pulls the slide 130 down. When this occurs the cut 144 should be beneath the roller 132. The roller 132 is therefore caught by the underside of the rim of the disk and the slide is held down even if the solenoid is deenergized.

The springs 129 are now coming into contact with cam rail 133 and the loop circuit is broken. This breaking of the loop circuit has to precede a call on the dial. It corresponds to the replacing of the receiver preceding every call. Should for instance the called subscriber's line be busy it is necessary before a second call is made to restore the receiver to its hook or seat in order to break the loop circuit before dialling.

In order that calling of the number of the fire department may continue indefinitely at short intervals without restoring the relay to its original position a special means for breaking the loop circuit has therefore to be provided which means consists in the cam rail 133 and the springs 129.

The disk continues to rotate and the head 169 now first closes the loop (corresponding to the lifting of the receiver) and then three interruptions for example occur by means of pins 140. This corresponds to the dialling of the first digit of the number assumed to be "3." Then the next digits follow when the groups of pins 140*a*, 140*b*, 140*c* . . . follow.

After the fire department exchange has been reached the telephone lines are connected and the recorded message is delivered from head 135 over 81, 83 to amplifier 136 and from amplifier over transformer 137 to lines 100 and 139.

The slide 130 meanwhile, after a revolution is completed, returns as soon as the cut 144 reaches the position shown in Figure 1 in which the roller 132 may pass through the cut. The pair of springs 129 is thereby lifted and is no longer opened by the cam rail and the pins, so that the message will not be disturbed.

However after a certain number of revolutions of disk 112 the process of calling is repeated, when the cam block 103 on disk 102 has made a full turn. In this case the pair of springs 122 and 121 again closes simultaneously, the solenoid 126 is energized and the cycle as described is repeated. This repetition occurs again and again as long as the contact springs of the relay are in their operative position.

When the operator in the exchange has taken down or has made a record of the message he may stop further operations by sending for instance a current with a certain number of impulses into the line which passes condenser 95 and energizes magnet 90.

Upon such energization a circuit is closed from 66 over 84—88—84—46—54—92—11—64. Relay 11 is energized and armature 14 again lifts member 16 and tilts members 38 and 50, so that the contact springs resume the position shown in Figure 1. The arrangement is now restored and is ready for another operation.

It will be clear that the arrangement may be used for a burglar alarm as well or for a combined burglar and fire alarm of any type, because the operation which starts the relay action is merely a short timed closing of a circuit. Moreover it is clear that some of the details described are quite unessential and may be replaced by others without in any way affecting the operation or the result. Therefore only those constructions are to be regarded as essential which have been included in the annexed claims.

Having described the invention, what is claimed as new is:

1. An alarm system for use in connection with a subscriber's telephone station and line comprising an endless record, means for driving the same, an operative circuit for said driving means, means for translating the record into telephone currents, means for transmitting the telephone currents over the telephone line, a dialling circuit, means for dialling the number of a predetermined alarm station and an operative circuit for the same, means including a relay controlling the operative circuits of the record driving means and of the dialling means, an operative relay circuit, alarm contacts for closing said circuit and means for holding the relay in its operative position after it has been energized.

2. An alarm system for use in connection with a subscriber's telephone station and line comprising an endless record, means for driving the same continuously, an operative circuit for said driving means, a means for picking up the recorded message from the record and for translating it into telephone currents delivered to the telephone line, a dialling circuit associated with the subscriber's line, means for dialling the number of a predetermined alarm station, means for repeating said dialling at fixed time intervals, an operative circuit for said dialling means, means including a relay controlling the operative circuits of said record driving and dialling means, an operative circuit for said relay, alarm contacts for closing said operative relay circuit, relay contacts and means operated by said relay for bringing the relay contacts permanently into an operative position upon operation of the relay.

3. An alarm system for use in connection with a subscriber's telephone station and line comprising an alarm circuit including alarm contacts, a relay and an operative circuit for the same, said relay circuit being controlled by the alarm contacts, a relay armature, a plurality of relay contacts moved to and remaining in a definite contact position after each actuation of the relay armature, an endless record and electric driving means for the same, an operative circuit for said driving means, controlled by one of said relay contacts, a pick up for translating the record impulses into telephone currents, means for transmitting said telephone currents to the telephone line, a normally open dialling circuit closed by the relay contacts associated with the subscriber station.

4. An alarm system for use in connection with a subscriber's telephone station and line comprising an endless record, means for driving the same, an operative circuit for said driving means, means for translating the record into telephone currents, means for transmitting the telephone currents over the telephone line, a dialling circuit, means for dialling the number of a predetermined alarm station and an operative circuit for the same, a relay, including an armature, a set of fixed and a set of movable contact springs, said movable contact springs being mounted on a tiltable member movable between two positions, means operated by said armature at each energization for tilting said tiltable member, said set of contact springs controlling the operative circuits of the record driving means and of the dialling means, an operative relay circuit, and alarm contacts for closing said circuit.

5. A relay for the alarm system as claimed in claim 4, comprising a push member pivotally connected with the armature, a contact supported by said tiltable member, the set of movable contact springs being mounted on said plate, and a swing member operatively connected with said tiltable member and pushed by said push member for changing the position of the tiltable contact supporting member each time it is moved by said push member.

6. A relay for the alarm system as claimed in claim 4, comprising a base plate, a channel shaped push member pivotally connected with the relay armature, a set of fixed contacts mounted on said base member, a pivot pin for pivotally supporting said tiltable member on said base plate, a swing member pivoted on the same pivot and provided with shoulders on each side arranged within and cooperating with the channel shaped push member, a curved spring attached to said tiltable member and said swing member respectively, the latter being pushed by said push member upon operation of the armature moving from one side of the channel shaped member to the other side upon each operation and thus moving the tiltable member by the spring connection, and a contact plate carried by said tiltable member, said contact plate carrying the set of movable contacts.

7. An alarm system for use in connection with a subscriber's telephone station and line, comprising an alarm circuit including alarm contacts, a relay and an operative circuit therefor, controlled by the alarm contacts, a relay armature, a plurality of relay contacts moved to and remaining in a definite contact position after each actuation of the relay armature, an endless record and electric driving means for the same, an operative circuit for said driving means, controlled by one of said relay contacts, a pick up for translating the record impulses into telephone currents, means for transmitting said telephone currents to the telephone line, a dialling circuit controlled by one of the relay contacts, a pair of dialling impulse springs in said circuit, a slide adapted to be moved for supporting said impulse springs, an impulse disk provided with impulse producing means, arranged for rotation near said impulse springs, said impulse springs being actuated at predetermined intervals for a predetermined number of impulses upon rotation of said disk, means for rotating said disk connected with the record driving means, and means for moving said slide and impulse springs into and out of cooperative relation with the impulse producing means on the disk.

8. An alarm system as claimed in claim 7 wherein the slide carrying the impulse springs is moved by a solenoid, an operative circuit for said solenoid, said circuit being controlled by the movable contact spring of the relay.

9. An alarm system as claimed in claim 7 wherein the disk is provided with a cut, and the slide is provided with a roller passing through said cut, a solenoid for moving the slide and an operative circuit for said solenoid, controlled by the movable relay contacts, the slide and the impulse springs being held in its operative position with respect to the impulse producing means during a full rotation of the disk by the roller passing through the cut of the disk and held by the same during rotation.

10. An alarm system for use in connection with a subscriber's telephone station and line comprising an alarm circuit including alarm contacts, a relay and an operative circuit therefor, controlled by the alarm contacts, a relay armature, a plurality of relay contacts moved to and remaining in a definite contact position after each actuation of the relay armature, an endless record and electric driving means for the same, an operative circuit for said driving means, controlled by one of said relay contacts, a pick up for translating the record impulses into telephone currents, means for transmitting said telephone currents to the telephone line, a dialling circuit controlled by one of the relay contacts, a pair of dialling impulse springs in said circuit, a slide adapted to be moved for supporting said impulse springs, an impulse disk provided with impulse producing means, arranged for rotation near said impulse springs, said impulse springs being actuated at predetermined intervals for a predetermined number of impulses upon rotation of said disk, means for rotating said disk connected with the record driving means, a solenoid for moving said slide, moving the impulse springs out of operation with the impulse producing means, an operative circuit for the solenoid, controlled by the movable contact springs of the relay, pairs of further controlling springs in said operative circuit of the solenoid, a cam member on said impulse disk, closing one pair of said springs once during each revolution of said impulse disk, a second disk operatively connected with the first disk but rotating at a slower speed, a cam member on said second disk for closing a further pair of said controlling springs once during each revolution of said second disk and means on said slide for keeping the impulse spring in operative relationship to the impulse producing means during one revolution of the impulse disk after each closing of the solenoid circuit.

11. An alarm system for use in connection with a subscriber's telephone station and line comprising an endless record, means for driving the same continuously, an operative circuit for said driving means, a means for picking up the recorded message from the record and for translating it into telephone currents delivered to the telephone line, a dialling circuit associated with the subscriber's line, means for dialling the number of a predetermined alarm station, means for repeating said dialling at fixed time intervals, an operative circuit for said dialling means, a relay controlling the operative circuits of said record driving and dialling means, an operative circuit for said relay, alarm contacts for closing said operative relay circuit, relay contacts and means operated with said relay for bringing the relay contacts permanently into an operative position upon operation of the relay, and means for energizing the relay, a second tune after the first energization controlled by the called substation returning movable contact springs back into their original position.

12. An alarm system for use in connection with a subscriber's telephone station and line comprising an endless record, means for driving the same continuously, an operative circuit for said driving means, a means for picking up the recorded message from the record and for translating it into telephone currents delivered to the telephone line, a dialling circuit associated with the subscriber's line, means for dialling the number of a predetermined alarm station, means for repeating said dialling at fixed time intervals, an operative circuit for said dialling means, a relay controlling the operative circuits of said record driving and dialling means, an operative circuit for said relay, alarm contacts for closing said operative relay circuit, relay contacts and means operated by said relay for bringing the relay contacts permanently into an operative position upon operation of the relay, an electromagnet operated by a special energizing current, controlling an energizing circuit of the relay, said energizing circuit being further controlled by one of the relay contacts, an energizing circuit for said electromagnet, connected with the telephone line, and means located in the predetermined alarm station for sending an energizing current through said energizing circuit.

DAVID B. TALBOT.

REFERENCES CITED

The following references are of record in the file of this patent:

UNITED STATES PATENTS

| Number | Name | Date |
|---|---|---|
| 2,036,420 | Lowry | Apr. 7, 1936 |
| 2,131,565 | Lanersdorf | Sept. 27, 1938 |
| 2,332,776 | Bell | Oct. 26, 1943 |